(12) United States Patent
Kim et al.

(10) Patent No.: US 11,953,066 B2
(45) Date of Patent: Apr. 9, 2024

(54) BRAKE DISC AND METHOD OF MANUFACTURING THE SAME

(71) Applicants: HYUNDAI MOTOR COMPANY, Seoul (KR); KIA CORPORATION, Seoul (KR); SEOHAN INDUSTRY CO., LTD., Jincheon-gun (KR)

(72) Inventors: Yoon-Cheol Kim, Suwon-si (KR); Kyung-Rok Choi, Suwon-si (KR); Sang-Bum Koh, Suwon-si (KR); Seong-Kweon Joo, Hwaseong-si (KR); Ki-Jeong Kim, Hwaseong-si (KR); Jae-Seok Lee, Hwaseong-si (KR)

(73) Assignees: HYUNDAI MOTOR COMPANY, Seoul (KR); KIA CORPORATION, Seoul (KR); SEOHAN INDUSTRY CO., LTD., Jincheon-gun (KR)

( * ) Notice: Subject to any disclaimer, the term of this patent is extended or adjusted under 35 U.S.C. 154(b) by 106 days.

(21) Appl. No.: 17/711,278

(22) Filed: Apr. 1, 2022

(65) Prior Publication Data
US 2023/0193966 A1    Jun. 22, 2023

(30) Foreign Application Priority Data
Dec. 16, 2021    (KR) .................. 10-2021-0180832

(51) Int. Cl.
*F16D 65/12*   (2006.01)
*B22D 19/16*   (2006.01)
*F16D 65/02*   (2006.01)

(52) U.S. Cl.
CPC .......... *F16D 65/123* (2013.01); *B22D 19/16* (2013.01); *F16D 65/125* (2013.01);
(Continued)

(58) Field of Classification Search
CPC .......... F16D 65/12; F16D 65/123–128; B22D 19/0081
(Continued)

(56) References Cited

U.S. PATENT DOCUMENTS

| 4,808,275 A | * | 2/1989 | Ohzora | ............... F16D 65/0006 29/DIG. 12 |
| 6,152,270 A | * | 11/2000 | Giorgetti | ............... F16D 65/128 188/218 XL |

(Continued)

FOREIGN PATENT DOCUMENTS

| JP | 2012-525549 A1 | 10/2012 |
| KR | 2016-0148820 A | 12/2016 |

(Continued)

*Primary Examiner* — Christopher P Schwartz
(74) *Attorney, Agent, or Firm* — MCDONNELL BOEHNEN HULBERT & BERGHOFF LLP

(57) ABSTRACT

The present disclosure relates to a brake disc including a braking part having a circular plate shape having a hollow portion and a plurality of coupling portions protruding and extending from an inner diameter surface thereof, and a hat part disposed in the hollow portion and having a plurality of insertion portions protruding laterally, in which the plurality of coupling portions is respectively coupled to the plurality of insertion portions, and the coupling portion of the braking part and the insertion portion of the hat part are joined to only one of an outboard portion or an inboard portion of the braking part. According to the present disclosure, it is possible to reduce noise occurring at a position at which the hat part and the braking part are coupled to each other and improve cooling performance.

5 Claims, 7 Drawing Sheets

(52) U.S. Cl.
CPC ............. *F16D 2065/1304* (2013.01); *F16D 2065/1344* (2013.01); *F16D 2200/0013* (2013.01); *F16D 2250/0015* (2013.01); *F16D 2250/0046* (2013.01)

(58) Field of Classification Search
USPC ........................................ 188/18 A, 218 XL
See application file for complete search history.

(56) References Cited

U.S. PATENT DOCUMENTS

| | | | |
|---|---|---|---|
| 6,564,912 B1* | 5/2003 | Koschinat | F16D 65/12 |
| | | | 188/218 XL |
| 8,511,442 B2 | 8/2013 | Mueller | |
| 9,829,057 B2 | 11/2017 | Chung et al. | |
| 2011/0290602 A1* | 12/2011 | Kleber | F16D 65/12 |
| | | | 188/218 XL |
| 2013/0037359 A1* | 2/2013 | Kim | F16D 65/12 |
| | | | 188/218 XL |
| 2014/0326551 A1* | 11/2014 | Anderson | F16D 65/12 |
| | | | 164/75 |
| 2016/0369857 A1 | 12/2016 | Chung et al. | |
| 2018/0080514 A1* | 3/2018 | Chung | F16D 65/125 |
| 2020/0208695 A1 | 4/2020 | Paul | |
| 2023/0035715 A1* | 2/2023 | Maronati | F16D 65/125 |

FOREIGN PATENT DOCUMENTS

| | | |
|---|---|---|
| KR | 10-1964125 B1 | 4/2019 |
| KR | 10-1972270 B1 | 4/2019 |
| KR | 10-2141551 B1 | 8/2020 |

\* cited by examiner (Prior Art)

(Prior Art)

<9th ORDER DTV>

BRAKE DISC AND METHOD OF MANUFACTURING THE SAME

CROSS REFERENCE TO RELATED APPLICATIONS

This application claims priority to Korean Patent Application No. 10-2021-0180832, filed on Dec. 16, 2021, which is incorporated herein by reference in its entirety.

BACKGROUND

Field of the Disclosure

The present disclosure relates to a brake disc coupled to a wheel hub and a method of manufacturing the same.

Description of Related Art

A brake disc refers to a circular plate-shaped component coupled to a wheel hub of a vehicle and configured to rotate together with a wheel. Pads are pressed against two opposite surfaces of the brake disc to brake the vehicle with friction.

Meanwhile, the global automobile manufacturers make great efforts to develop technologies for improving fuel economy in order to cope with a shortage of petroleum energy and a problem with climatic change. Among the technologies for improving fuel economy, a technology for reducing a weight of a vehicle without degrading performance is attracting attention.

In particular, a reduction in unsprung mass directly related to a wheel driving load is efficient in improving fuel economy, and as a result, a technology related to the reduction in unsprung mass has been rapidly developed.

Among the technologies in the related art, a technology of manufacturing a brake disc by using a mixture of existing gray cast iron and spheroidal graphite cast iron which is a high-strength cast iron material has been proposed as a solution for reducing the weight of the vehicle without degrading the performance of the brake disc that accounts for a majority of the weight of the unsprung mass.

However, as illustrated in FIG. 1, the technology in the related art has a drawback in that rumbling noise may occur because of a structural problem of the brake disc during a process of testing a brake. This is because dimensional waveforms are formed by as many as the number of connection bridges because connection parts 30 between a lightweight part (hat part) 10 and a braking part (a friction surface) 20 are disposed in the braking part 20.

That is, as illustrated in FIG. 2, a support end 11 of the lightweight part is inserted between an outboard portion 21 and an inboard portion 22 of the braking part and positioned in the braking part, and coupling parts of the nine connection parts 30 are positioned in braking surfaces. Therefore, as illustrated in FIG. 3, noise occurs because of a 9th order waveform among fast Fourier transform (FFT) spectrum analysis orders in waveforms of braking surface disc thickness variation (DTV). When a high-order waveform spectrum is large, vibration occurs at a high frequency when the disc rotates at the same degree, and the vibration disadvantageously affects noise properties.

In addition, air cannot flow because of the coupling part, which causes deterioration in cooling performance.

The above information disclosed in this Background section is only for enhancement of understanding of the background of the invention and therefore it may contain information that does not form the prior art that is already known in this country to a person of ordinary skill in the art.

SUMMARY

Accordingly, an object of the present disclosure considering the above point is to provide a brake disc capable of reducing noise occurring at a position at which a hat part and a braking part are coupled to each other and improving cooling performance, and a method of manufacturing the same.

As a preferred embodiment, the present disclosure provides a brake disc including a braking part having a circular plate shape having a hollow portion and a plurality of coupling portions protruding and extending from an inner diameter surface thereof, and a hat part disposed in the hollow portion and having a plurality of insertion portions protruding laterally, in which the plurality of coupling portions is respectively coupled to the plurality of insertion portions, and the coupling portion of the braking part and the insertion portion of the hat part are joined to only one of an outboard portion or an inboard portion of the braking part.

Further, the hat part may have a support end extending laterally while forming a stepped portion from a periphery of the circular plate, and the plurality of insertion portions may protrude and extend laterally from the support end.

In this case, the plurality of insertion portions may be formed at equal intervals on a concentric circle, and the plurality of coupling portions may be formed at equal intervals on a concentric circle.

In addition, the outboard portion and the inboard portion of the braking part, which has the circular plate shape having the hollow portion, may overlap each other in parallel with each other in a double manner.

Further, a plurality of outer coupling ends may protrude and extend from an inner diameter surface of the outboard portion, and a plurality of inner coupling ends may protrude and extend from an inner diameter surface of the inboard portion and correspond to the plurality of outer coupling ends.

Furthermore, a coupling portion may be extended and bent from an end of each of the plurality of outer coupling ends, and the coupling portion may have a coupling groove into which the insertion portion is inserted.

Further, an outer diameter of an end of the insertion portion may be expanded, and an inlet of the coupling groove may be narrower than an interior of the coupling groove.

Meanwhile, an end of the coupling portion may be spaced apart from the inner coupling end.

In addition, the hat part may be made of a different material from the braking part.

In another preferred embodiment, the present disclosure provides a method of manufacturing a brake disc, the method including manufacturing the hat part by casting, and manufacturing the braking part by casting by inserting the hat part into a mold having a cavity having a shape corresponding to a shape of the braking part.

The method may further include performing anti-rust treatment by applying an anti-rust agent onto the support end and the insertion portion after the manufacturing of the hat part by casting.

In this case, the hat part may be made of a different material from the braking part.

Further, an end of the coupling portion may be spaced apart from the inner coupling end.

The structure and process method related to the brake disc according to the present disclosure, which are newly developed to improve noise properties while maintaining the weight reduction effect and braking performance, may obtain the following effects.

It is possible to solve the problem of rumbling noise caused by 9th order deterioration by improving both the coupling structure and the heat dissipation structure.

It is possible to manufacture the product according to the designed structure by developing the casting sequence suitable for the shape and structure.

Therefore, it is possible to reduce the weight and ensure durability against noise caused by braking friction.

In addition, the effect of reducing costs is higher than the technology of reducing the weight by using aluminum, and the quality management is easily performed in terms of scratches, heat treatment, surface treatment, and the like.

DETAILED DESCRIPTION

Hereinafter, embodiments of the present disclosure will be described in detail with reference to the exemplary accompanying drawings, and since these embodiments, as examples, may be implemented in various different forms by those skilled in the art to which the present disclosure pertains, they are not limited to the embodiments described herein.

In order to sufficiently understand the present disclosure, advantages in operation of the present disclosure, and the object to be achieved by carrying out the present disclosure, reference needs to be made to the accompanying drawings for illustrating an exemplary embodiment of the present disclosure and contents disclosed in the accompanying drawings.

Further, in the description of the present disclosure, the repetitive descriptions of publicly-known related technologies will be reduced or omitted when it is determined that the descriptions may unnecessarily obscure the subject matter of the present disclosure.

Figure 1:
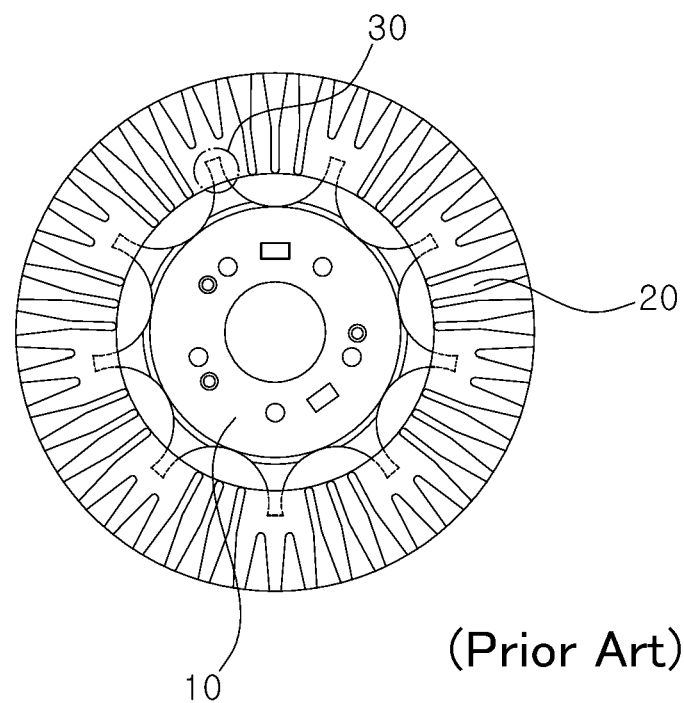
FIG. 1 is a view illustrating a brake disc in the prior art.
Figure 2:
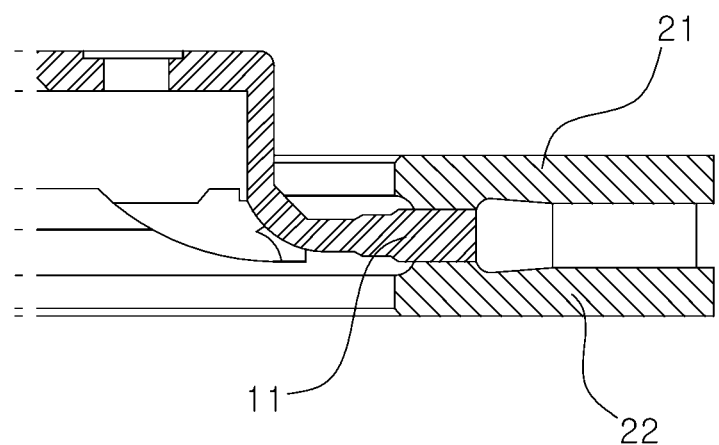
FIG. 2 is a view illustrating a partially cross-sectional shape of the brake disc shown in FIG. 1.
Figure 3:
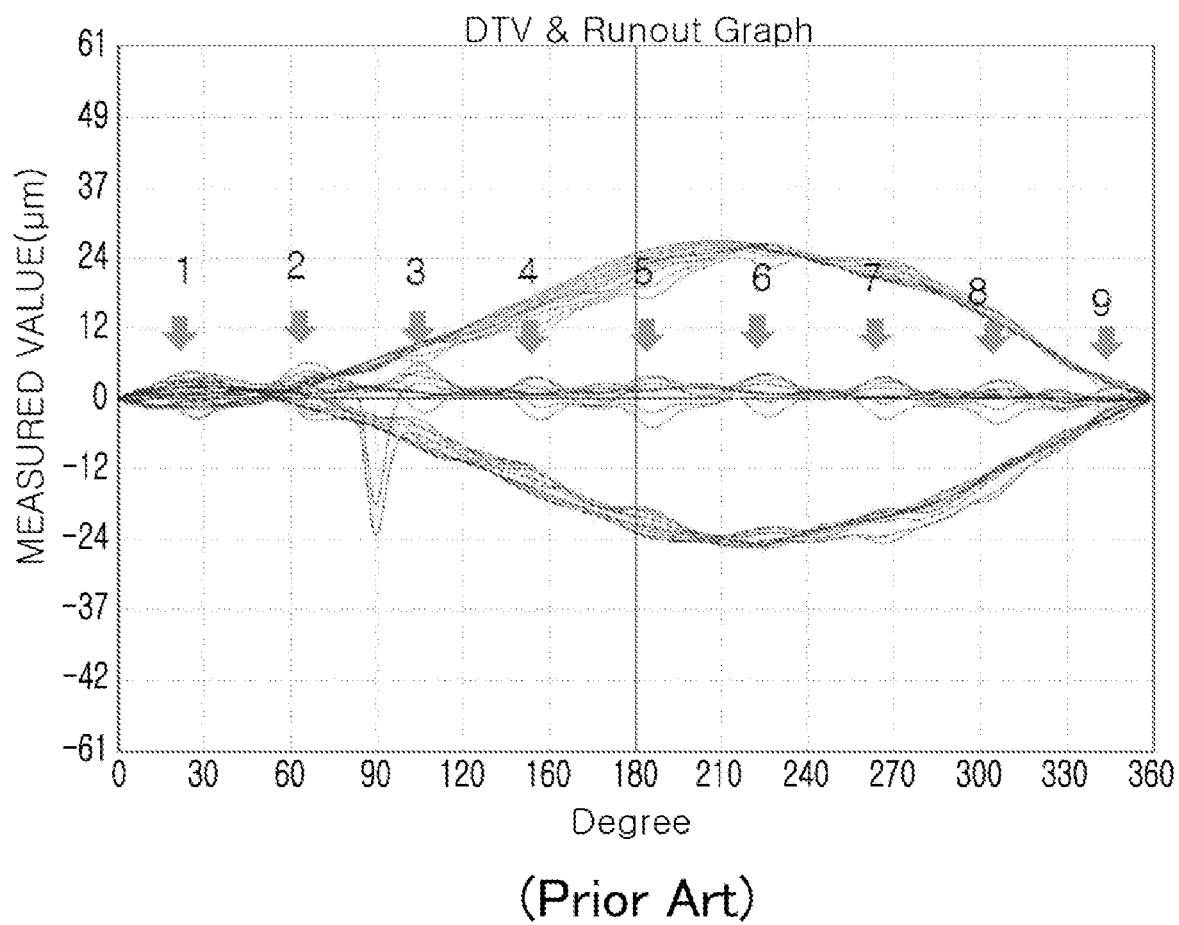
FIG. 3 is a view illustrating 9th waveforms made by a brake disc in the prior art.
Figure 4:
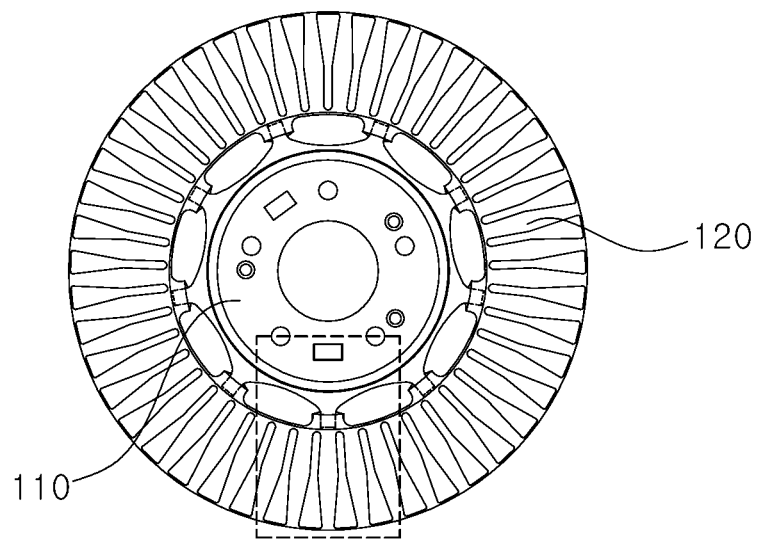
FIG. 4 is a view illustrating a brake disc according to the present disclosure.
Figure 5:
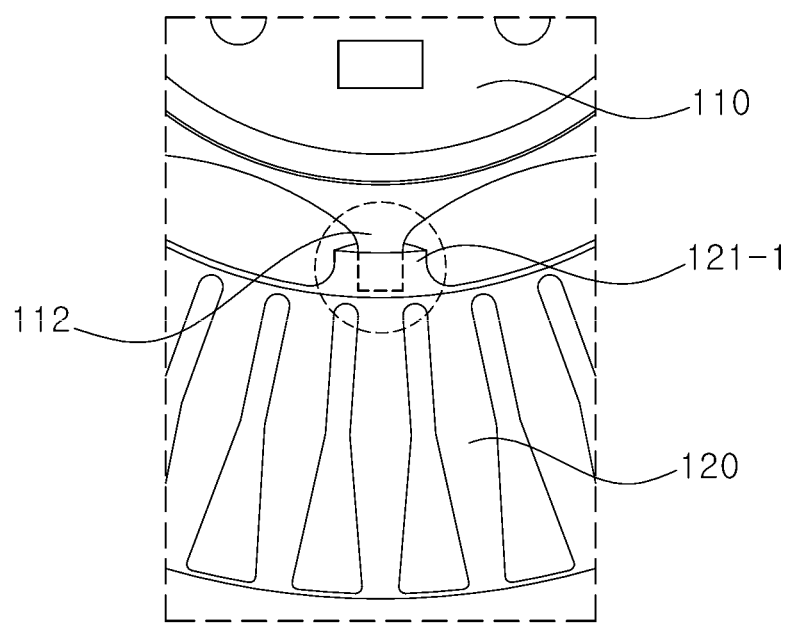
FIG. 5 is an enlarged view of a dotted line region illustrated in FIG. 4.
Figure 6:
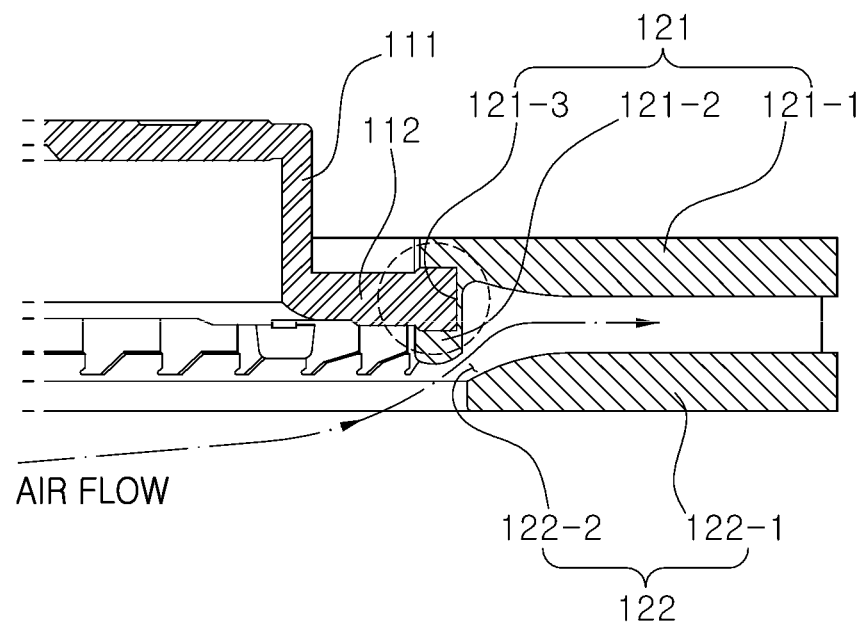
FIG. 6 is a view illustrating a cross-sectional shape of a coupling part of the brake disc according to the present disclosure.

FIG. 4 is a view illustrating a brake disc according to the present disclosure, and FIG. 5 is an enlarged view of a dotted line region illustrated in FIG. 4. Further, FIG. 6 is a view illustrating a cross-sectional shape of a coupling part of the brake disc according to the present disclosure.

Hereinafter, a brake disc and a method of manufacturing the same according to the embodiment of the present disclosure will be described with reference to FIGS. 4 to 6.

The brake disc according to the present disclosure serves to reduce rumbling noise occurring at a connection portion between a hat part and a braking part and improve cooling performance. The brake disc includes a braking part 120 configured to generate a braking force by producing friction with brake pads, and a hat part 110 fastened to a wheel hub and configured to rotate together with the wheel hub. The hat part 110 is made of a different material from the braking part 120.

That is, the hat part 110 is made of a high-strength material, which may reduce a thickness and weight of the hat part 110.

The hat part 110 has a fastening hole or the like formed in a flat plate shape having a hollow portion so that the hat part 110 is structurally coupled to the wheel hub.

Like a hat shape, a support end 111 extends laterally while forming a stepped portion from a periphery of a circular plate. A plurality of insertion portions 112 extends laterally from the support end 111 while defining predetermined intervals therebetween and is coupled to the braking part 120 to be described below.

The hat part 110 may be made of spheroidal graphite cast iron (ductile iron), for example, FCD500K in the following example.

The braking part 120 includes an outboard portion 121 and an inboard portion 122 that each have a circular plate shape having a hollow portion and overlap each other in parallel with each other to form a double disk plate. The outboard portion 121 has outer coupling ends 121-1 corresponding in position and number to the insertion portions 112, and protruding and extending from an inner surface of the outboard portion 121 and an inner diameter surface of the braking part toward the center of the brake disc. The inboard portion 122 has inner coupling ends 122-1 corresponding in position and number to the insertion portions 112, and protruding and extending from an inner surface of the inboard portion 122 and the inner diameter surface of the braking part toward the center of the brake disc.

Further, a coupling portion 121-2 extends and is bent downward from an end of the outer coupling end 121-1, and a coupling groove 121-3 to be coupled to the insertion portion 112 is formed in the coupling portion 121-2 and coupled to the insertion portion 112.

Further, as illustrated in FIG. 6, an outer diameter of the end of the insertion portion 112 is expanded, and an inlet of the coupling groove is formed to be narrower than an interior of the coupling groove, such that the insertion portion 112 is not easily separated from the coupling groove after being inserted into the coupling groove.

In addition, the end of the coupling portion 121-2 is spaced apart from the inner coupling end 122-1, such that a flow of air occurs in a separation space, as illustrated in FIG. 6, which improves cooling performance.

The outboard portion 121 and the inboard portion 122 may be formed in a reverse manner. As described above, the hat part 110 is coupled only to any one of the outboard portion 121 and the inboard portion 122 of the braking part 120, and a position at which the braking part 120 and the hat part 110 are coupled to each other is positioned outside the braking part 120 (between the hat part and the braking part) instead of being positioned inside the braking part 120 that produces friction with the brake pads, reduces the occurrence of noise caused by a 9th order in the related art.

The braking part 120 may be made of gray cast iron such as FC200D, FC170D, and FC250D.

A method of manufacturing the brake disc will now be described. First, the hat part 110 is manufactured by casting using a mold having a cavity having a shape corresponding to a shape of the hat part 110. The hat part 110 may be made of FCD500K.

The manufacturing process is completed by performing precise post-treatment on the insertion portion 112 of the hat part 110 manufactured by casting, and anti-rust treatment is performed on the hat part 110 by applying an anti-rust agent onto the support end 111 and the insertion portion 112.

Next, the braking part 120 is manufactured by casting by inserting the hat part 110, which has been manufactured as described above, into a mold having a cavity having a shape corresponding to a shape of the braking part 120.

A finished product is manufactured by performing a post-process such as rough machining, finish grinding, GEOMET coating, polishing, and balancing on the brake disc manufactured by casting as described above.

As described above, the brake disc according to the present disclosure may be manufactured by manufacturing the hat part 110 having the embossed portion, i.e., the insertion portion 112 by casting before manufacturing the braking part 120 having the debossed coupling portion 121-2 by casting.

Figure 7:
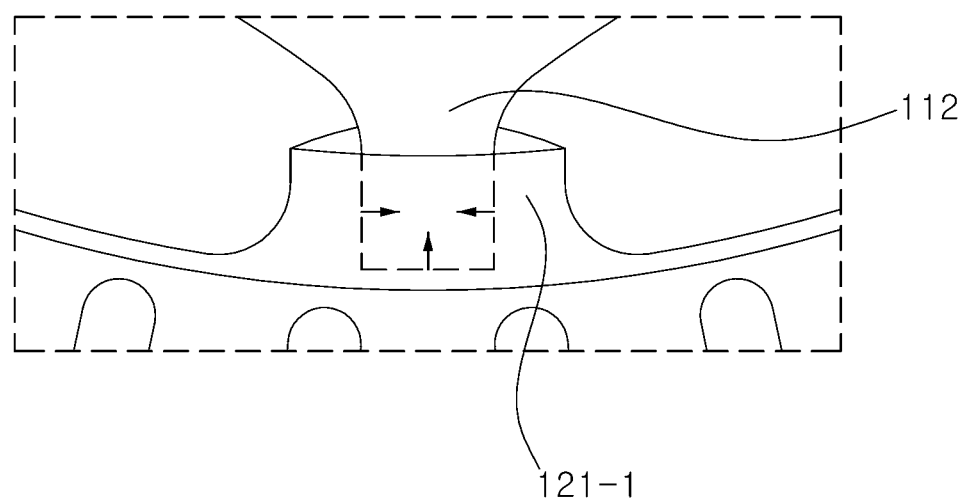
FIG. 7 is a view illustrating a state in which the brake disc according to the present disclosure is manufactured by casting.

This method uses coagulation reaction properties of the casting. This method is applied because the debossed portion needs to surround the embossed portion while being contracted and coagulated in order to prevent a gap caused by the contraction. If the debossed portion is formed by casting first and then the embossed portion is formed by casting, a gap is formed in the arrow directions by the contraction, as illustrated in FIG. 7, which may cause vibration while the vehicle travels.

Figure 8:
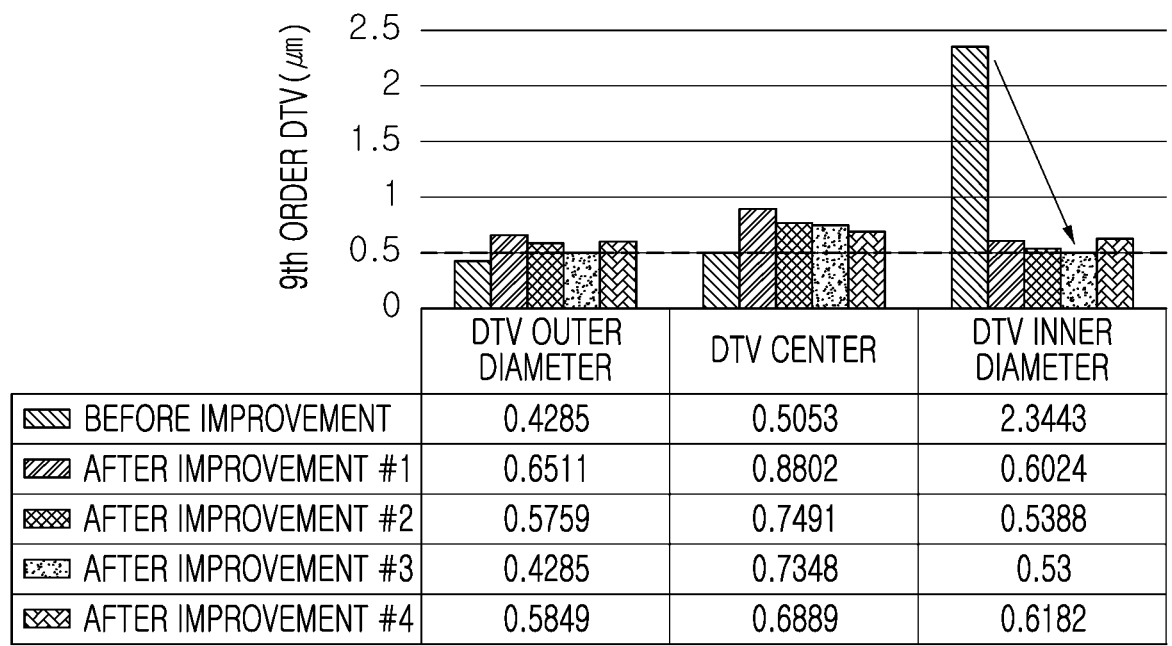
FIGS. 8 and 9 are views schematically illustrating results of evaluating rumbling noise.
Figure 9:
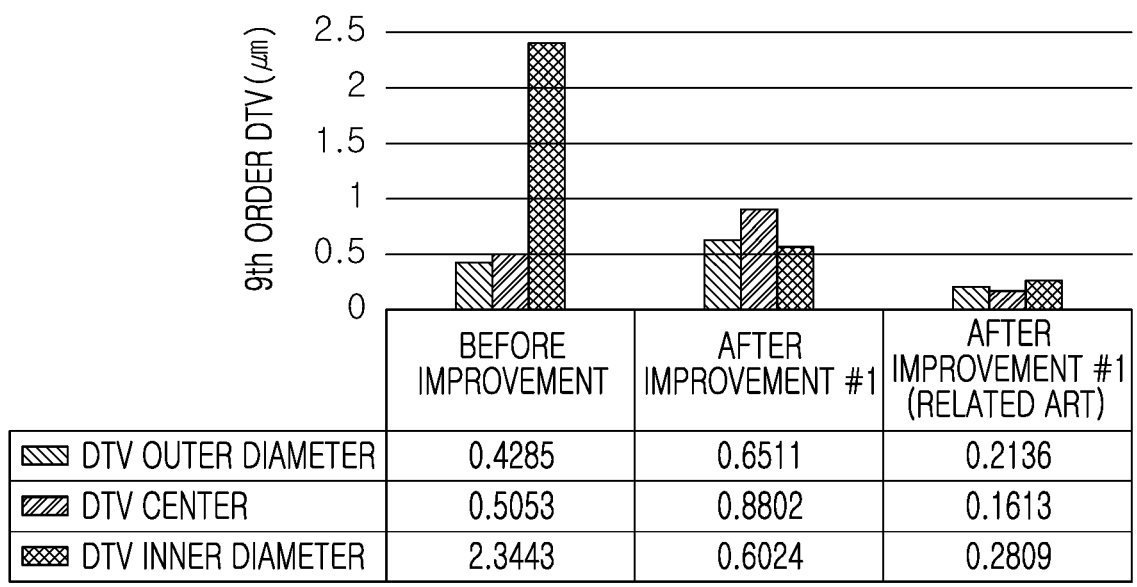

FIGS. 8 and 9 are graphs illustrating a result of evaluating rumbling noise. FIG. 8 illustrates a result of performing a test on an actual vehicle, and FIG. 9 illustrates a result of performing a test on an actual road. DTV stands for disc thickness variation.

As illustrated in FIGS. 8 and 9, according to the result of performing the test on the brake disc according to the present disclosure, it can be seen that no rumbling noise occurred in Cases #1, #2, #3, and #4 improved by applying the present disclosure, and Cases #1, #2, #3, and #4 are more excellent in 9th order properties than the case before improvement.

Figure 10:
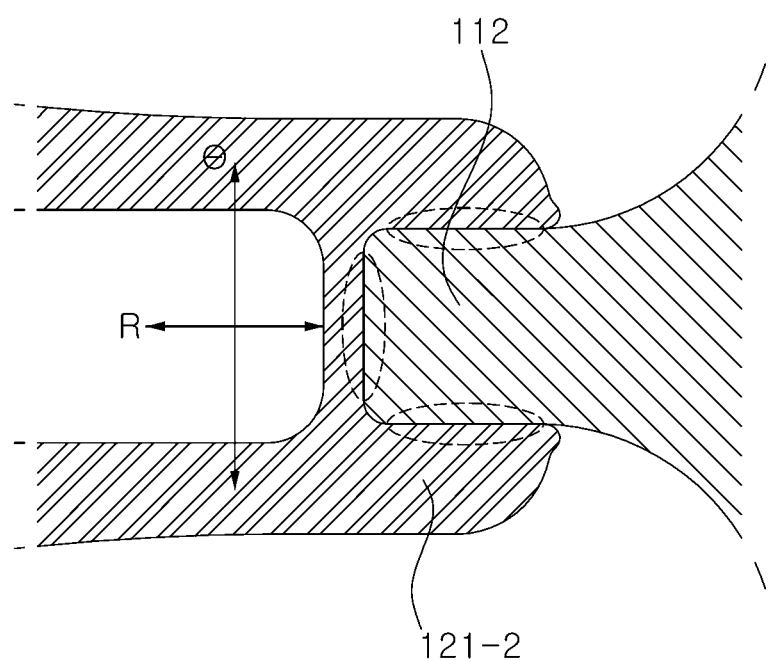
FIG. 10 is a view illustrating a result of CT measurement on a prototype of the brake disc according to the present disclosure.

Further, FIG. 10 is a view illustrating a result of CT measurement on a prototype of the brake disc according to the present disclosure after the vehicle travels on an actual road. A clearance may be formed in a dotted line portion in the related art. In contrast, according to the present disclosure, it can be seen that the insertion portion 112 and the coupling portion 121-2 are in close contact with each other in R and θ directions by casting and no clearance occurs in the dotted line portion according to a result of evaluating durability of the vehicle traveling on an actual road.

As described above, the brake disc according to the present disclosure may improve both the coupling structure and the heat dissipation structure, thereby solving a problem of rumbling noise caused by 9th order deterioration.

While the present disclosure has been described with reference to the exemplified drawings, it is obvious to those skilled in the art that the present disclosure is not limited to the aforementioned embodiments, and may be variously changed and modified without departing from the spirit and the scope of the present disclosure. Accordingly, the changed or modified examples belong to the claims of the present disclosure and the scope of the present disclosure should be interpreted on the basis of the appended claims.

The invention claimed is:

1. A brake disc comprising:
a braking part having a circular plate shape having a hollow portion and a plurality of coupling portions protruding and extending from an inner diameter surface; and
a hat part positioned in the hollow portion and having a plurality of insertion portions protruding laterally;
wherein the each of the plurality of coupling portions is coupled to one of the plurality of insertion portions, and each of the coupling portions and each of the insertion portions are joined to only one of an outboard portion or an inboard portion of the braking part;
wherein a plurality of outer coupling ends protrude and extend from an inner diameter surface of the outboard portion, and a plurality of inner coupling ends protrude and extend from an inner diameter surface of the inboard portion, and corresponds to the plurality of outer coupling ends;
wherein a coupling portion extends and is bent from an end of each of the plurality of outer coupling ends, and the coupling portion has a coupling groove into which the insertion portion is inserted; and
wherein an outer diameter of an end of the insertion portion is larger than an outer diameter of a middle of the insertion portion, and an inlet of the coupling groove is narrower than an interior of the coupling groove.

2. The brake disc of claim 1, wherein the hat part has a support end extending laterally and forming a stepped portion from a periphery of the circular plate, and each of the plurality of insertion portions protrudes and extends laterally from the support end.

3. The brake disc of claim 2, wherein the plurality of insertion portions are formed at equal intervals on a concentric circle, and the plurality of coupling portions are formed at equal intervals on a concentric circle.

4. The brake disc of claim 2, wherein the outboard portion and the inboard portion of the braking part each have a circular plate shape having a hollow portion, overlap each other in parallel to form a double disk plate.

5. The brake disc of claim 4, wherein the hat part is made of spheroidal graphite cast iron, and the braking part is made of gray cast iron.

* * * * *